(12) United States Patent
Kemertas et al.

(10) Patent No.: US 11,580,392 B2
(45) Date of Patent: Feb. 14, 2023

(54) APPARATUS FOR DEEP REPRESENTATION LEARNING AND METHOD THEREOF

(71) Applicant: SAMSUNG ELECTRONICS CO., LTD., Suwon-si (KR)

(72) Inventors: Mete Kemertas, Toronto (CA); Leila Pishdad, Toronto (CA); Konstantinos Derpanis, Toronto (CA); Afsaneh Fazly, Toronto (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 348 days.

(21) Appl. No.: 16/805,051

(22) Filed: Feb. 28, 2020

(65) Prior Publication Data

US 2020/0380358 A1 Dec. 3, 2020

Related U.S. Application Data

(60) Provisional application No. 62/854,559, filed on May 30, 2019.

(51) Int. Cl.
*G06F 16/23* (2019.01)
*G06N 3/08* (2023.01)
*G06F 16/2457* (2019.01)

(52) U.S. Cl.
CPC ............ *G06N 3/08* (2013.01); *G06F 16/23* (2019.01); *G06F 16/24578* (2019.01)

(58) Field of Classification Search
CPC ...... G06N 3/08; G06F 16/23; G06F 16/24578
USPC .................................................. 707/748–749
See application file for complete search history.

(56) References Cited

U.S. PATENT DOCUMENTS

| | | | | |
|---|---|---|---|---|
| 7,831,531 | B1* | 11/2010 | Baluja | G06N 3/08 706/25 |
| 8,065,248 | B1* | 11/2011 | Baluja | G06N 3/08 706/25 |
| 9,298,172 | B2 | 3/2016 | Tesauro et al. | |
| 9,971,940 | B1* | 5/2018 | Sbaiz | G06K 9/6271 |
| 10,043,109 | B1* | 8/2018 | Du | G06V 10/764 |

(Continued)

OTHER PUBLICATIONS

Communication dated Aug. 12, 2021, from the European Patent Office in European Application No. 20814286.9.

(Continued)

*Primary Examiner* — Hanh B Thai
(74) *Attorney, Agent, or Firm* — Sughrue Mion, PLLC

(57) ABSTRACT

An apparatus for providing similar contents, using a neural network, includes a memory storing instructions, and a processor configured to execute the instructions to obtain a plurality of similarity values between a user query and a plurality of images, using a similarity neural network, obtain a rank of each the obtained plurality of similarity values, and provide, as a most similar image to the user query, at least one among the plurality of images that has a respective one among the plurality of similarity values that corresponds to a highest rank among the obtained rank of each of the plurality of similarity values. The similarity neural network is trained with a divergence neural network for outputting a divergence between a first distribution of first similarity values for positive pairs, among the plurality of similarity values, and a second distribution of second similarity values for negative pairs, among the plurality of similarity values.

17 Claims, 10 Drawing Sheets

(56) References Cited

U.S. PATENT DOCUMENTS

| | | | |
|---|---|---|---|
| 10,108,858 B2 | 10/2018 | Derakhshani et al. | |
| 10,248,967 B2* | 4/2019 | Liu | G06F 16/9535 |
| 10,296,531 B2* | 5/2019 | Tang | G06F 16/367 |
| 10,467,526 B1* | 11/2019 | Appalaraju | G06V 10/449 |
| 10,824,942 B1* | 11/2020 | Bhotika | G06F 16/56 |
| 10,909,459 B2* | 2/2021 | Tsatsin | G06N 3/0454 |
| 11,080,918 B2* | 8/2021 | Chen | G06V 10/764 |
| 2017/0076224 A1 | 3/2017 | Munawar | |
| 2017/0357896 A1* | 12/2017 | Tsatsin | G06N 3/084 |
| 2018/0114055 A1 | 4/2018 | Wang et al. | |
| 2018/0144245 A1* | 5/2018 | Simard | G06V 10/82 |
| 2018/0276528 A1 | 9/2018 | Lin et al. | |
| 2019/0080225 A1* | 3/2019 | Agarwal | G06N 5/04 |
| 2019/0095788 A1* | 3/2019 | Yazdani | G06N 3/08 |
| 2019/0102651 A1 | 4/2019 | Song et al. | |
| 2020/0184256 A1* | 6/2020 | Ye | H04N 5/232945 |
| 2020/0226421 A1* | 7/2020 | Almazan | G06V 20/52 |
| 2020/0320769 A1* | 10/2020 | Chen | G06V 10/454 |

OTHER PUBLICATIONS

Faith Cakir et al., "Hashing with Mutual Information", IEEE Transactions on Pattern Analysis and Machine Intelligence, Mar. 2, 2018, pp. 1-13 (13 pages total).

Fatih Cakir et al., "MIHash: Online Hashing with Mutual Information", Arxiv.org, Mar. 27, 2017, pp. 1-16 (16 pages total).

Mete Kemertas et al., "RankMI: A Mutual Information Maximizing Ranking Loss", IEEE/CVF Conference on Computer Vision and Pattern Recognition (CVPR), 2020, pp. 14350-14359 (10 pages total).

Communication dated Aug. 14, 2020, issued by the International Searching Authority in International Application No. PCT/KR2020/006183 (PCT/ISA/220, 210, 237).

Duan et al., "Deep Adversarial Metric Learning," 2018 IEEE/CVF, Conference on Computer Vision and Pattern Recognition, Dec. 17, 2018, pp. 2780-2789.

* cited by examiner

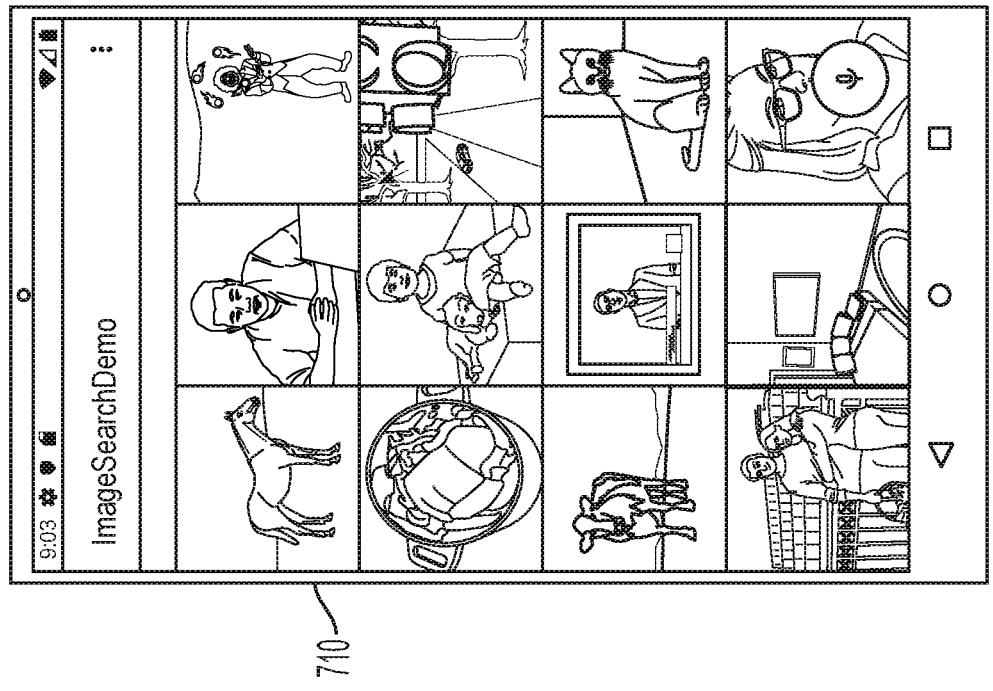
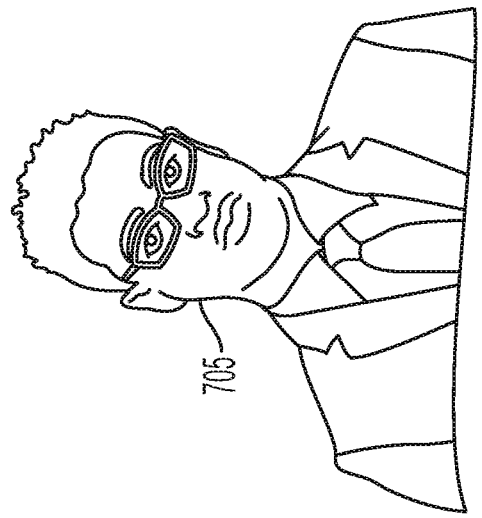
FIG. 7A

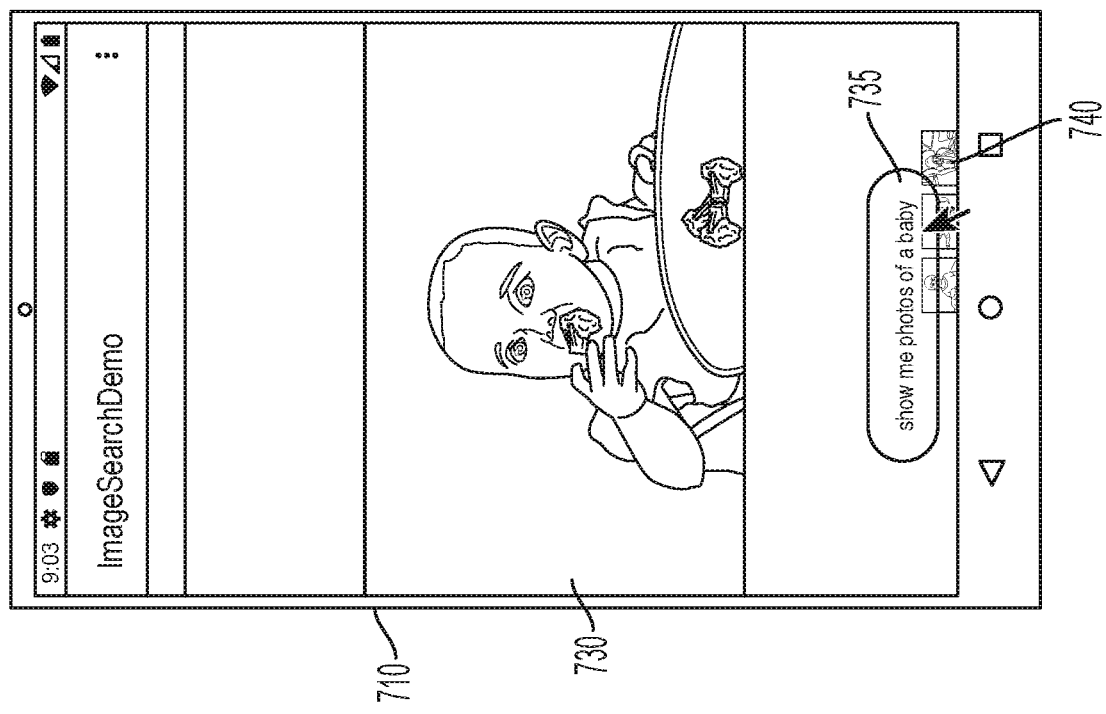
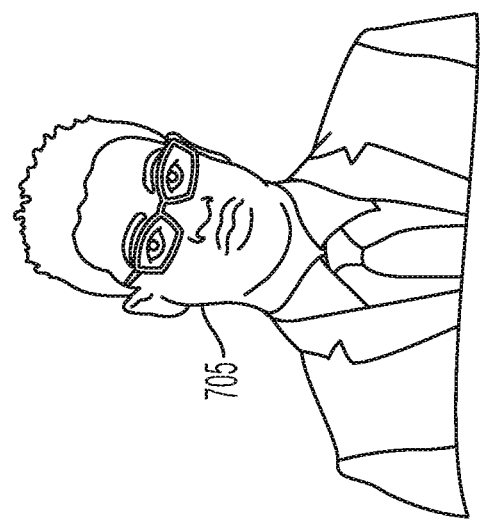
FIG. 7C

APPARATUS FOR DEEP REPRESENTATION LEARNING AND METHOD THEREOF

CROSS-REFERENCE TO RELATED APPLICATION

This application claims priority from U.S. Provisional Patent Application No. 62/854,559, filed on May 30, 2019, in the U.S. Patent and Trademark Office, the disclosure of which is incorporated herein by reference in its entirety.

BACKGROUND

1. Field

The disclosure relates to artificial intelligence, and more particularly, to an apparatus for deep representation learning and a method thereof.

2. Description of Related Art

Deep representation learning is fundamental for many downstream applications, including image retrieval, face re-identification, 3D object retrieval, image captioning, and cross-modal learning and retrieval. Most such tasks use complex neural network architectures to transform their input (e.g., images, 3D shapes, text or audio captions, etc.) into an embedding space. The objective is to learn representations that yield high proximity for semantically related or matching items (e.g., same-category images/objects, faces of the same person, and paired image-captions) and low proximity for semantically unrelated or non-matching ones (e.g., images/objects of different types, faces of different people, non-matching image-captions). A common practice is to formulate representation learning as a retrieval (or ranking) problem where matching and non-matching query-value pairs are used as positive/negative examples for training.

A variety of ranking-based loss functions have been proposed in the literature, including triplet loss, quadruplet loss, and histogram loss. Triplet and quadruplet losses compute and aggregate the differences between similarities of positive and negative pairs, hence are sensitive to the sampling strategy and may suffer from inefficiency in sampling. The histogram loss addresses these challenges by providing empirical estimates of the distributions of positive and negative samples, and then directly calculating the probability of a random negative pair having a higher similarity score than a random positive pair.

SUMMARY

According to embodiments, an apparatus for providing similar contents, using a neural network, includes a memory storing instructions, and a processor configured to execute the instructions to obtain a plurality of similarity values between a user query and a plurality of images, using a similarity neural network, obtain a rank of each the obtained plurality of similarity values, and provide, as a most similar image to the user query, at least one among the plurality of images that has a respective one among the plurality of similarity values that corresponds to a highest rank among the obtained rank of each of the plurality of similarity values. The similarity neural network is trained with a divergence neural network for outputting a divergence between a first distribution of first similarity values for positive pairs, among the plurality of similarity values, and a second distribution of second similarity values for negative pairs, among the plurality of similarity values.

The similarity neural network may be trained to maximize the divergence output by the divergence neural network.

The positive pairs may be matching pairs among samples that are used to train the similarity neural network, and the negative pairs may be non-matching pairs among the samples.

The similarity neural network may be trained by obtaining a loss based on a loss function in which the divergence is input, and by updating parameters of the similarity neural network and the divergence neural network, based on the obtained loss.

The loss function may include a first negative term of a lower bound on the divergence.

The loss function may further include a second negative term that is obtained to maintain positive a derivative of a function that is represented by the divergence neural network.

The user query comprises a textual or spoken utterance of a user.

According to embodiments, a method of providing similar contents, using a neural network, includes obtaining a plurality of similarity values between a user query and a plurality of images, using a similarity neural network, obtaining a rank of each the obtained plurality of similarity values, and providing, as a most similar image to the user query, at least one among the plurality of images that has a respective one among the plurality of similarity values that corresponds to a highest rank among the obtained rank of each of the plurality of similarity values. The similarity neural network is trained with a divergence neural network for outputting a divergence between a first distribution of first similarity values for positive pairs, among the plurality of similarity values, and a second distribution of second similarity values for negative pairs, among the plurality of similarity values.

The similarity neural network may be trained to maximize the divergence output by the divergence neural network.

The positive pairs may be matching pairs among samples that are used to train the similarity neural network, and the negative pairs may be non-matching pairs among the samples.

The similarity neural network may be trained by obtaining a loss based on a loss function in which the divergence is input, and by updating parameters of the similarity neural network and the divergence neural network, based on the obtained loss.

The loss function may include a first negative term of a lower bound on the divergence.

The loss function may further include a second negative term that is obtained to maintain positive a derivative of a function that is represented by the divergence neural network.

The user query comprises a textual or spoken utterance of a user.

A non-transitory computer-readable storage medium stores instructions to cause a processor to obtain a plurality of similarity values between a user query and a plurality of images, using a similarity neural network, obtain a rank of each the obtained plurality of similarity values, and provide, as a most similar image to the user query, at least one among the plurality of images that has a respective one among the plurality of similarity values that corresponds to a highest rank among the obtained rank of each of the plurality of similarity values. The similarity neural network is trained with a divergence neural network for outputting a divergence between a first distribution of first similarity values for positive pairs, among the plurality of similarity values, and a second distribution of second similarity values for negative pairs, among the plurality of similarity values.

The similarity neural network may be trained to maximize the divergence output by the divergence neural network.

The positive pairs may be matching pairs among samples that are used to train the similarity neural network, and the negative pairs may be non-matching pairs among the samples.

The similarity neural network may be trained by obtaining a loss based on a loss function in which the divergence is input, and by updating parameters of the similarity neural network and the divergence neural network, based on the obtained loss.

The loss function may include a first negative term of a lower bound on the divergence.

The loss function may further include a second negative term that is obtained to maintain positive a derivative of a function that is represented by the divergence neural network.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects and features of embodiments of the disclosure will be more apparent from the following description taken in conjunction with the accompanying drawings, in which:

FIGS. 7A, 7B and 7C are diagrams illustrating a use case of the apparatus shown in FIG. 5.

DETAILED DESCRIPTION

Figure 1:
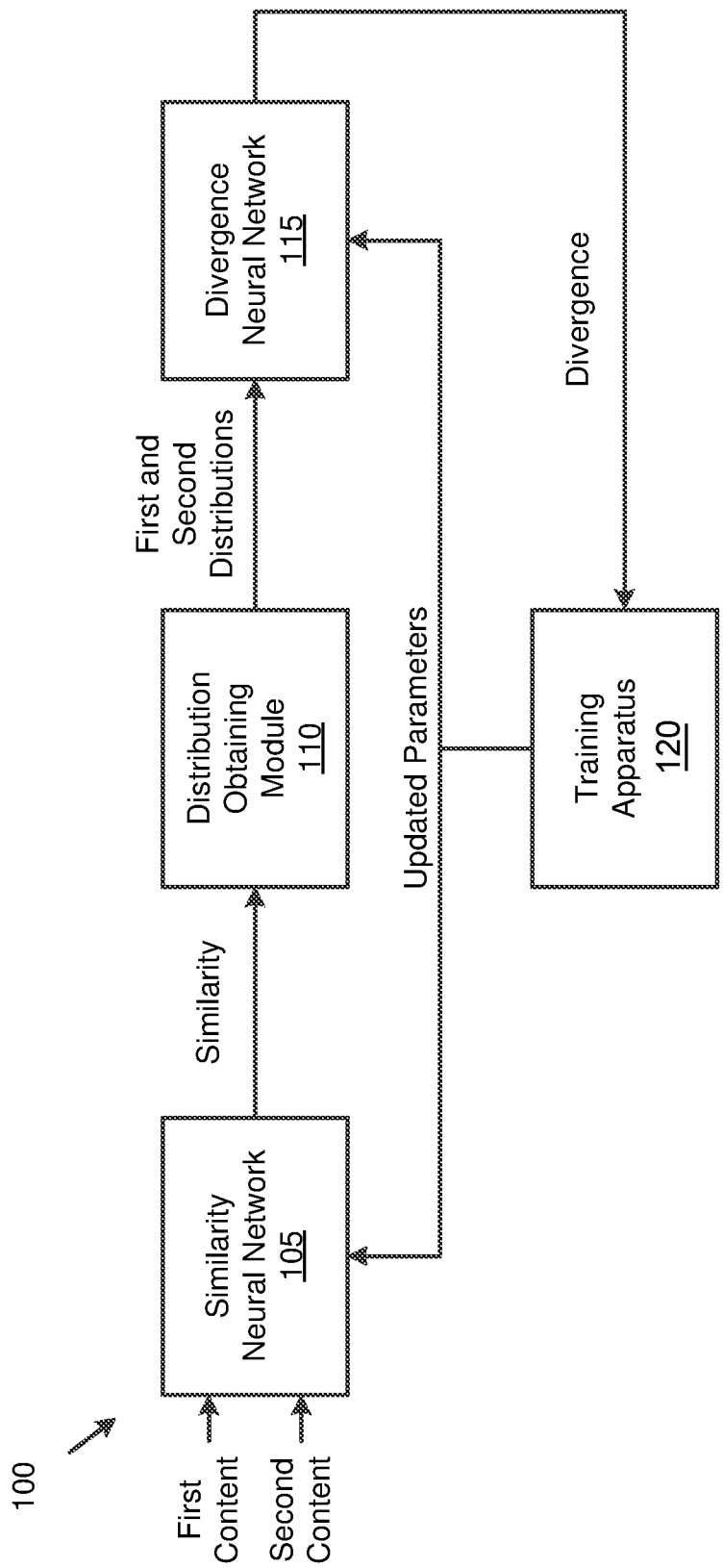
FIG. 1 is a block diagram of an apparatus for deep representation learning, according to embodiments.

Embodiments of the disclosure provide an apparatus for deep representation learning and a method thereof. A ranking-based loss function is used and draws on information theory to estimate an overlap between distributions of similarities for positive and negative pairs without having to directly compute the distributions. The ranking-based loss function approximates mutual information between two random variables (e.g., queries and values in a ranking setting) by estimating tight lower bounds on a divergence between their joint probability (positive samples) and product of marginals (approximated via negative samples). The ranking-based loss function uses a parametrized neural network to estimate the mutual information and consequently the overlap between the positive and negative similarity distributions.

Minimizing the above overlap may not be sufficient for ranking, because the goal is to not only separate positives from negatives, but also to preserve a correct ordering between the two (that is, positive pairs should be ranked higher than negatives). The ranking-based loss function thus contains a second component that may enforce a soft constraint on the divergence estimator via a gradient penalty method.

Thus, the embodiments provide an information-theoretic loss function for ranking and retrieval, with connections to triplet and quadruplet losses as special cases. The loss function does not require its input (pair-wise similarity scores) to be bounded, hence broadening a range of similarity functions that can be used. Further functional knowledge (e.g., locally increasing behavior) is incorporated into the loss function via a gradient penalty method, making the loss function applicable to retrieval tasks.

As the disclosure allows for various changes and numerous examples, the embodiments will be illustrated in the drawings and described in detail in the written description. However, this is not intended to limit the disclosure to modes of practice, and it will be understood that all changes, equivalents, and substitutes that do not depart from the spirit and technical scope of the disclosure are encompassed in the disclosure.

In the description of the embodiments, detailed explanations of related art are omitted when it is deemed that they may unnecessarily obscure the essence of the disclosure. Also, numbers (for example, a first, a second, and the like) used in the description of the specification are identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module," two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the present specification, an 'image' or a 'picture' may denote a still image, a moving image including a plurality of consecutive still images (or frames), or a video.

Also, in the present specification, a 'parameter' is a value used in an operation process of each layer forming a neural network, and for example, may include a weight used when an input value is applied to an operation expression. Here, the parameter may be expressed in a matrix form. The parameter is a value set as a result of training, and may be updated through separate training data when necessary.

Throughout the disclosure, the expression "at least one of a, b or c" indicates only a, only b, only c, both a and b, both a and c, both b and c, all of a, b, and c, or variations thereof.

FIG. 1 is a block diagram of an apparatus 100 for deep representation learning, according to embodiments.

As shown in FIG. 1, the apparatus 100 includes a similarity neural network 105, a distribution obtaining module 110, a divergence neural network 115 and a training apparatus 120.

The similarity neural network 105 obtains first and second contents, and obtains a similarity value between the obtained first and second contents. The similarity neural network 105 may include any type of artificial neural network such as a deep neural network (DNN). Each of first and second contents may include any type of multimedia contents including, e.g., an image, text (captions, a user query, etc.), audio, video or any combination thereof. The first content may be considered as a query, and the second content may be considered as a value. The similarity value may include any similarity metric, such as, e.g., a cosine similarity value.

The first and second content may be obtained from a data storage medium including a magnetic medium such as a hard disk, a floppy disk, or a magnetic tape, an optical recording medium such as CD-ROM or DVD, or a magneto-optical medium such as a floptical disk. The first and second content may also be obtained from an input interface including, for example, a touchscreen, a camera, a microphone, a keyboard, a mouse or any combination thereof.

The distribution obtaining module 110 obtains, from the similarity neural network 105, a plurality of similarity values between the first content and a plurality of contents including the second content, the plurality of similarity values being obtained by the similarity neural network 105. The distribution obtaining module 110 obtains a first distribution of first similarity values for positive pairs, among the obtained plurality of similarity values, and a second distribution of second similarity values for negative pairs, among the obtained plurality of similarity values.

The divergence neural network 115 obtains, from the distribution obtaining module 110, the obtained first and second distributions. The divergence neural network 115 obtains a divergence between the first and second distributions. The divergence neural network 115 may include any type of artificial neural network such as a DNN. The divergence may include, e.g., the Kullback-Leibler (KL) divergence or the Jensen-Shannon divergence. The positive pairs may include a matching pair between the first content and one of the plurality of contents, and the negative pairs may include a non-matching pair between the first content and another one of the plurality of contents.

The training apparatus 120 is a training module that obtains the obtained divergence from the divergence neural network 115, and obtains a loss based on a loss function in which the obtained divergence is input. The training apparatus 120 further updates parameters of both the similarity neural network 105 and the divergence neural network 115, based on the obtained loss, and sets the similarity neural network 105 and the divergence neural network 115 respectively based on the updated parameters. Further description of training the similarity neural network 105 and the divergence neural network 115 will be described in FIGS. 2-4 below.

The apparatus 100 may be implemented through a dedicated processor or through a combination of software and general-purpose processor such as application processor (AP), central processing unit (CPU) or graphic processing unit (GPU). The dedicated processor may be implemented by including a memory for implementing embodiments of the disclosure or by including a memory processor for using an external memory.

Also, the apparatus 100 may be configured by a plurality of processors. In this case, the apparatus 100 may be implemented through a combination of dedicated processors or through a combination of software and general-purpose processors such as AP, CPU or GPU.

Further, the apparatus 100 may include a CPU, a memory, and a computer program including instructions. The computer program is stored in the memory. The apparatus 100 may respectively perform functions described with reference to FIGS. 1-4 according to execution of the computer program by the CPU. The functions described with reference to FIGS. 1-4 are performed by a dedicated hardware chip and/or the CPU.

Figure 2:
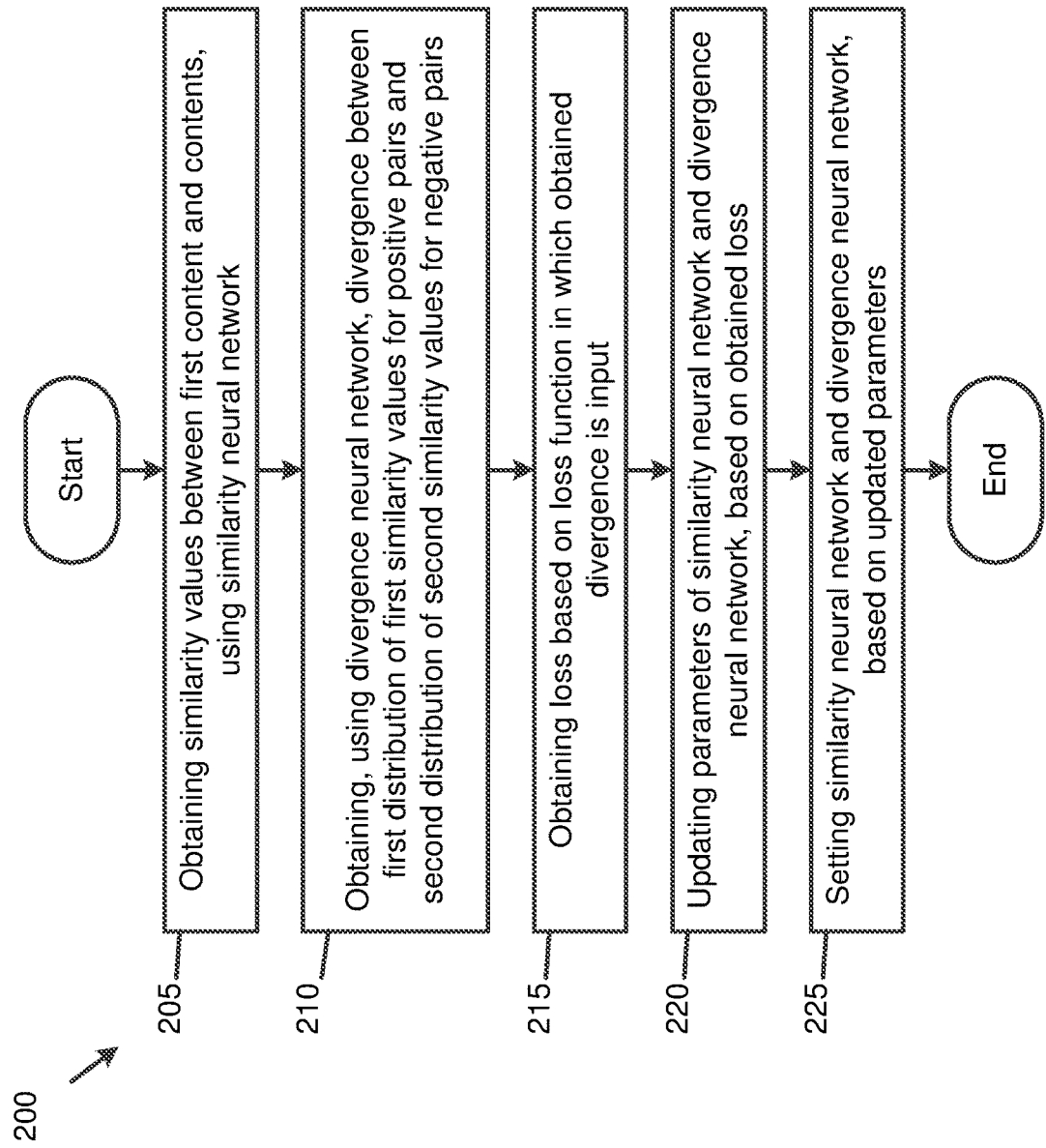
FIG. 2 is a flowchart of a method of deep representation learning, according to embodiments.

FIG. 2 is a flowchart of a method 200 of deep representation learning, according to embodiments.

Referring to FIG. 2, the method 200 may be performed by the apparatus 100 of FIG. 1.

In operation 205, the method 200 includes obtaining a plurality of similarity values between a first content and a plurality of contents, using the similarity neural network 105. In detail, the similarity neural network 105 represents a differentiable distance function $d_{ij}$, or inverse similarity, where (i,j) is a query-value pair of a downstream retrieval task, e.g., an image-caption pair, images of faces, 3D shapes, etc. The differentiable distance function $d_{ij}$ may be also represented as a differentiable similarity $S_\theta(x, y)$, where (x, y) is a query-value pair of a downstream retrieval task.

In operation 210, the method 200 includes obtaining, using the divergence neural network 115, a divergence between a first distribution of first similarity values for positive pairs, among the obtained plurality of similarity values, and a second distribution of second similarity values for negative pairs, among the obtained plurality of similarity values.

In detail, mutual information I(X; Y) between two random variables X and Y can be expressed as the following KL divergence:

$$I(X;Y) = D_{KL}(\mathbb{P}_{XY} \| \mathbb{P}_X \otimes \mathbb{P}_Y) \qquad (1)$$

The Donsker-Varadhan representation of the KL divergence may establish a lower bound:

$$D_{KL}(\mathbb{P}_{XY} \| \mathbb{P}_X \otimes \mathbb{P}_Y) \geq \sup_{T \in \mathcal{F}} \mathbb{E}_{\mathbb{P}_{XY}}[T(x,y)] - \log(\mathbb{E}_{\mathbb{P}_X \otimes \mathbb{P}_Y}[e^{T(x,y)}]), \qquad (2)$$

where $\mathcal{F}$ contains all functions T such that expectations are finite.

The Mutual Information Neural Estimator (MINE) yields a tight lower bound on mutual information using a neural network $T_\phi$ (the divergence neural network 115) that is parametrized by $\phi$:

$$I(X;Y) \geq I_\phi(X,Y), \qquad (3)$$

where:

$$I_\phi(X,Y) = \sup_{\phi \in \Phi} \mathbb{E}_{\mathbb{P}_{XY}}[T_\phi(x,y)] - \log(\mathbb{E}_{\mathbb{P}_X \otimes \mathbb{P}_Y}[e^{T_\phi(x,y)}]). \qquad (4)$$

Maximizing a tight estimate of the Jensen-Shannon divergence also maximizes mutual information, but has favorable properties in optimization. Similar to Equation (4), the neural network $T_\phi$ (the divergence neural network 115) with the parameters $\phi$ can be used to estimate a tight lower bound on the Jensen-Shannon divergence with its dual representation:

$$\hat{I}_\phi^{(JSD)}(X,Y) = \sup_\phi \{ \mathbb{E}_{\mathbb{P}_{XY}}[-\log(1+e^{-T_\phi(x,y)})] - \mathbb{E}_{\mathbb{P}_X \otimes \mathbb{P}_Y}[\log(1+e^{T_\phi(x,y)})] \}. \qquad (5)$$

In operation 215, the method 200 includes obtaining a loss based on a loss function in which the obtained divergence is input.

In detail, the loss function $\mathcal{L}_{RankMI}$ may be defined as follows:

$$\mathcal{L}_{RankMI} = \mathcal{L}_{overlap} + \lambda \mathcal{L}_{order}, \qquad (6)$$

where $\mathcal{L}_{overlap}$ captures an overlap loss between the first distribution of the first similarity values for the positive pairs and the second distribution of the second similarity values for the negative pairs, $\mathcal{L}_{order}$ enforces a specific order between the first and second distributions, and λ is a positive, scalar weighting factor.

To minimize the overlap loss $\mathcal{L}_{overlap}$ between the first and second distributions, the estimated Jensen-Shannon divergence of Equation (5) may be maximized between them:

$$\mathcal{L}_{overlap}(x,y,\phi,\theta) = -\hat{I}_{\phi,\theta}^{(JSD)}(x,y), \qquad (7)$$

where $T_\phi$ may be defined as follows:

$$T_\phi(x,y,\theta) = M_\phi(S_\theta(x,y)), \qquad (8)$$

where $M_\phi$ is a 1D function that is approximated by a neural network with the parameters φ.

Figure 3:
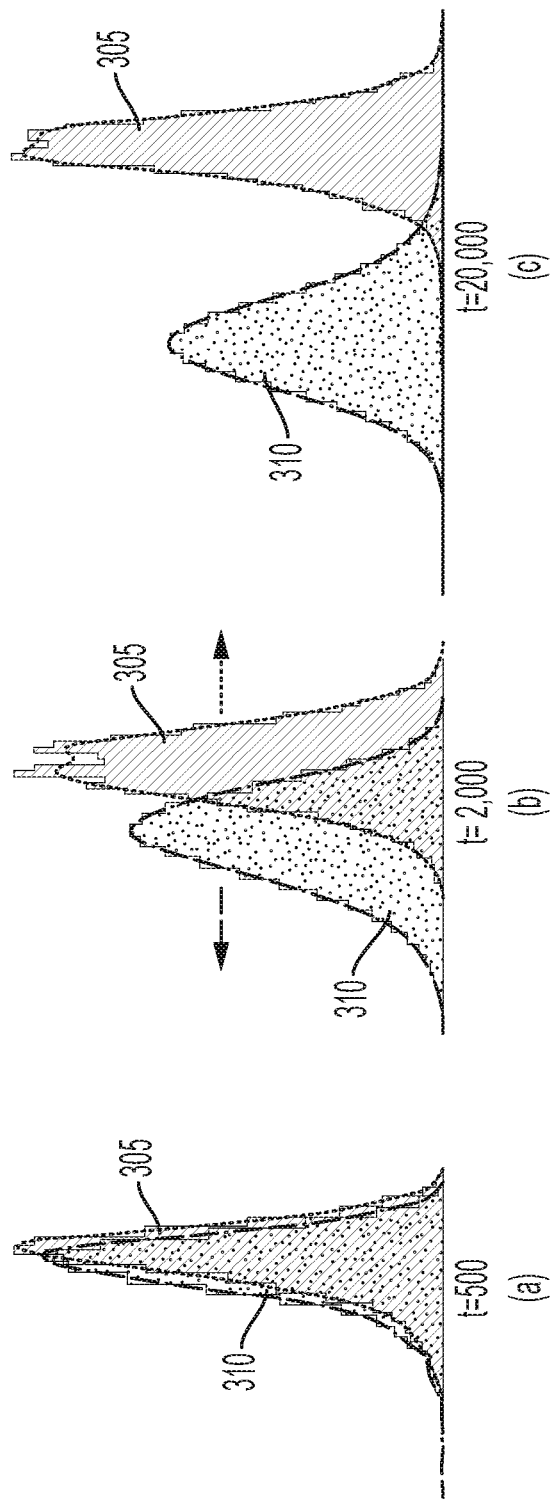
FIG. 3 is a diagram of graphs illustrating an objective of an overlap loss, according to embodiments.

FIG. 3 is a diagram of graphs illustrating an objective of an overlap loss, according to embodiments.

Referring to FIG. 3, at 500 training steps t, portion (a) shows a first distribution 305 of first similarity values for positive pairs of a validation set, among a plurality of similarity values $S_\theta(x, y)$, and a second distribution 310 of second similarity values for negative pairs of the validation set, among the plurality of similarity values $S_\theta(x, y)$. A divergence between the first and second distributions is minimal.

At 2,000 training steps t, portion (b) shows the first distribution 305 being moved in a right direction and the second distribution 310 being moved in a left direction. Thus, the divergence between the first and second distributions 305 and 310 is increased.

At 20,000 training steps t, portion (c) shows the first distribution 305 being further moved in the right direction and the second distribution 310 being further moved in the left direction. Thus, the divergence between the first and second distributions 305 and 310 is maximized, and overlap between the first and second distributions 305 and 310 is minimized, to improve overall performance of retrieval of content-content (e.g., image-text) matching.

The 1D function $M_\phi$ learns how much to move the first and second distributions 305 and 310 to maximize the divergence between the first and second distributions 305 and 310. Unlike previous work, a loss function does not require the plurality of similarity values to be normalized. This broadens a range of similarity functions that can be used.

Referring again to Equation (6), a limitation of optimizing the overlap loss $\mathcal{L}_{overlap}$ alone is that it could separate the first and second distributions while admitting high negative and low positive similarity values. Thus, a second loss term $\mathcal{L}_{order}$ softly constrains the 1D function $M_\phi$ such that similarity values of positives (sampled from $\mathbb{P}_{XY}$) and negatives (sampled from $\mathbb{P}_X \otimes \mathbb{P}_Y$) are maximized and minimized, respectively. Formally, this requirement can be expressed as follows:

$$\forall(x,y) \sim \mathbb{P}_{XY}, \mathrm{sgn}(\nabla_\theta \mathcal{L}_{overlap}) = -\mathrm{sgn}(\nabla_\theta S(x,y)); \text{ and} \qquad (9a)$$

$$\forall(x,y) \sim \mathbb{P}_X \otimes \mathbb{P}_Y, \mathrm{sgn}(\nabla_\theta \mathcal{L}_{overlap}) = \mathrm{sgn}(\nabla_\theta S(x,y)). \qquad (9b)$$

This requirement may be satisfied if the following hold for the 1D function $M_\phi$:

$$\forall(x,y) \sim \mathbb{P}_{XY}, dM/dS > 0; \text{ and} \qquad (10a)$$

$$\forall(x,y) \sim \mathbb{P}_X \otimes \mathbb{P}_Y, dM/dS > 0. \qquad (10b)$$

That is, if the 1D function $M_\phi$ is increasing around a neighborhood of similarity values for positive and negative pairs at a given timestamp during training, the similarity values of the positive pairs are always maximized and the similarity values of the negative pairs are always minimized. The gradient penalty method may define the second loss term $\mathcal{L}_{order}$ as follows:

$$\mathcal{L}_{order}(x,y,\phi,\theta) = -\min(0, dM_\phi(S_\theta(x,y))/dS_\theta(x,y)). \qquad (11)$$

With this second loss term $\mathcal{L}_{order}$, a parameter space φ is softly constrained to the corresponding 1D function $M_\phi$ that respect a correct ordering. In other words, if a derivative of the 1D function $M_\phi$ is negative, then a penalty is applied via the second loss term $\mathcal{L}_{order}$ to reverse the negative derivative.

Referring again to FIG. 2, in operation 220, the method 200 includes updating parameters of both the similarity neural network 105 and the divergence neural network 115, based on the obtained loss, i.e., to minimize the obtained loss.

In operation 225, the method 200 includes setting the similarity neural network 105 and the divergence neural network 115, based on the updated parameters.

The above-described loss function $\mathcal{L}_{RankMI}$ has connections with triplet and quadruplet losses. To enable direct comparison, the triplet and quadruplet losses may be reformulated using a notation that captures a spectrum of sampling strategies. The triplet loss $\mathcal{L}_{trp}$ may be reformulated as follows:

$$\mathcal{L}_{trp} = \Sigma_{i=1}^N \mathbb{E}_\mathbb{Q} [S_\theta(x_i,y^-) - S_\theta(x_i,y^+) + \eta]_+, \qquad (12)$$

where N is a number of samples in a dataset, $\mathbb{Q}$ describes a distribution for sampling a pair $(y^+, y^-)$ for $x_i$ to form a triplet $(x_i, y^+, y^-)$, and $[.]_+$ denotes a max(0,.) operator.

For instance, a multimodal learning setup may be considered, in which for each batch of size B, there is a B×B similarity matrix S. A diagonal corresponds to positive pairs $(x_i, y^+ = y_i)$. In a case in which averaging triplet loss across all possible negatives $y^- = y_j$ such that j≠i within a batch, $\mathbb{Q}$ is described by a distribution with probability 1/(B−1) for non-diagonal entries of an $i^{th}$ row of S, and 0 for all other samples in the dataset. Similarly, picking a hardest negative within a batch is a case in which $\mathbb{Q}$ is a delta function with all of a probability mass on $$j = \arg\max_{j \in [1:B], i \neq j} (S_\theta(x_i, y_j) - S_\theta(x_i, y_i)).$$

Similarly, the quadruplet loss $\mathcal{L}_{quad}$ may be reformulated as follows:

$$\mathcal{L}_{quad} = \mathcal{L}_{trp} + \Sigma_{j=1}^N \mathbb{E}_\mathbb{R} [S_\theta(x_k,y^-) - S_\theta(x_j,y^+) + \gamma]_+, \qquad (13)$$

where k≠j and $\mathbb{R}$ describes a distribution for sampling $(x_k, y^-, y^+)$ to form quadruplets of positive pairs $(x_j, y^+)$ and negative pairs $(x_k, y^-)$. If $\mathbb{R}$ is defined such that k=j, the quadruplet term recovers triplet loss as defined in Equation 12. In that sense, a difference between triplet and quadruplet losses is characterized as a difference between sampling strategies, or the distributions $\mathbb{Q}$ and $\mathbb{R}$.

If M in the Jensen-Shannon lower bound of Equation (8) is fixed to be the following function:

$$M(x) = \begin{cases} \log(e^x - 1) & x > 0 \\ \text{undefined} & x = 0, \\ -\log(e^{-x} - 1) & x < 0 \end{cases} \qquad (14)$$

then the value being optimized, as in Equation (5), reduces to the quadruplet term in Equation (13) with a sufficiently large margin γ that retains all quadruplets. The margin γ is used to discard less informative quadruplets. However, a similar sampling strategy with margins using the loss function $\mathcal{L}_{RankMI}$ according to the embodiments could be adopted as well. Therefore, the triplet loss is a special case of the quadruplet loss with an anchor-based sampling strategy, and the quadruplet loss is a special case of the loss function $\mathcal{L}_{RankMI}$ with a fixed M. Moreover, bounds can be learned to be estimated tighter than those that can be estimated with the fixed function M in Equation (14). This ability to train on tighter bounds is a source of substantial performance improvements in the loss function $\mathcal{L}_{RankMI}$ according to the embodiments.

In other embodiments, mutual information, I(X, Y), between two random variables, X and Y, can be expressed as the following KL-divergence:

$$I(X;Y)=D_{KL}(\mathbb{J} \| \mathbb{M}) \quad (15)$$

where $\mathbb{J}$ is a joint probability distribution between X and Y, and $\mathbb{M}$ is their product of marginals.

On the basis of this connection, as well as lower bounds on the KL-divergence, a Mutual Information Neural Estimator (MINE) is obtained, which uses a neural network to estimate a tight lower bound on the mutual information. A dual representation of the Jensen-Shannon divergence may establish the lower bound on the mutual information, via a variational function $T_\phi$ as follows:

$$\hat{I}_\phi^{(JSD)}(X,Y) = \sup_{\phi \in \Phi} \{ \mathbb{E}_{\mathbb{J}}[T(x,y)] - \mathbb{E}_{\mathbb{M}}[-\log(2 - e^{T_\phi(x,y)})] \}, \quad (16)$$

where $T_\phi$ is a function of the following form:

$$T_\phi(x,y) = \log(2) - \log(1 + e^{-V_\phi(x,y)}). \quad (17)$$

This ensures that $T_\phi(x, y) < \log(2)$ for any value of $V_\phi$, and consequently, the second term in Equation (16) is finite as required.

A ranking loss function is proposed and maximizes the mutual information by maximizing the lower bound of the Jensen-Shannon divergence as in Equation (16). A neural network is used to learn the variational function $T_\phi$ that is defined as a function of a distance measurement over a learned embedding space.

In detail, let $z_i = f_\theta(x_i)$ be an image embedding that is computed over an image $x_i$ via $f_\theta: \mathbb{R}^n \to \mathbb{R}^d$, a deep neural network referred to as an embedding network (e.g., the similarity neural network 105). The purpose of the ranking loss function is to learn parameters θ such that images that share the same class label c are mapped in close proximity in the embedding space and therefore can be retrieved based on distance. Given a batch B of images, the ranking loss function is computed over two sets of paired image embeddings $\rho = \{(z_i, z_j) | c_i = c_j\}$ and $\mathcal{N} = \{(z_i, z_j) | c_i \neq c_j\}$ for $1 \leq i, j \leq B$ and $i \neq j$.

A sampling procedure for a positive (matching) pair of images ($x_i$, $x_j$) consists of initially sampling a class label, then sampling two images independently given the same class label. Under this conditional independent assumption, their joint distribution is obtained:

$$p(x_i, x_j) = \Sigma_{k \in C} p(c = k) p(x_i | c = k) p(x_j | c = k) \quad (18)$$

$$= \Sigma_{k \in C} p(c = k) p(x_i, x_j | c = k)$$

$$= \Sigma_{k \in C} p(x_i, x_j, c = k).$$

For a large number of classes $\|C\|$ and high entropy p(c), which is often the case in retrieval tasks, a sampling procedure for negative pairs closely approximates sampling from a product of marginals:

$$p(x_i) p(x_j) \approx \Sigma_{k \in C} \Sigma_{\substack{k' \in C \\ k' \neq k}} p(x_i | c = k) p(c = k) p(x_j | c = k') p(c = k'). \quad (19)$$

Therefore, using sample positive pairs p and sample negative pairs N in a mini-batch, expectations in Equation (16) can be estimated. Then, the ranking loss function can be constructed to maximize the lower bound on the mutual information between representations ($z_i$, $z_j$) of images depicting shared content (e.g., the same product, the same bird species), as in:

$$\mathcal{L}_{RankMI} = -\frac{1}{\|\rho\|} \Sigma_{(z_i, z_j) \in \rho} T_\phi(z_i, z_j) - \frac{1}{\|\mathcal{N}\|} \Sigma_{(z_i, z_j) \in \mathcal{N}} \log(2 - e^{T_\phi(z_i, z_j)}). \quad (20)$$

Based on Equation (17), a statistics network $T_\phi$ (e.g., the divergence neural network 115) may be defined as:

$$T_\phi(z_i, z_j) := \log(2) - \log(1 + e^{-V_\phi(d_{ij})}), \quad (21)$$

where $V_\phi: \mathbb{P} \to \mathbb{P}$ is a multi-layer perceptron (MLP), and $d_{ij}$ is a distance between embeddings ($z_i$, $z_j$), e.g., a normalized $L_2$ distance. Defining $T_\phi$ as a function of $d_{ij}$ allows the mutual information to be connected to the distance in the embedding space.

Along with the embedding network for learning d-dimensional feature vectors $z_i$, the statistics network $T_\phi$ is trained to capture statistics of distances between the vectors. Without explicitly modeling distributions of positive and negative pairs, a variational function $T_\phi$ is optimized to enable estimating their divergence. Once this estimator is available, it is used to provide training signals to the embedding network. This procedure does not necessitate prior assumptions on the distance distributions, allowing variational functions optimized to separate arbitrarily complex distributions to be learned.

Consideration for the design of the statistics network $T_\phi(.)$ are described such that it satisfies a requirement of ranking positive items closer than negative items for a given query. Let $p(d_{ij}^+|\theta_t)$ and $p(d_{ij}^-|\theta_t)$ be conditional density functions associated with positive pair distances $d_{ij}^+$ and negative pair distances $d_{ij}^-$, respectively, given embedding network parameters $\theta_t$ at timestep t. A property of any ranking loss is that gradient updates move positive pairs closer, and push negatives farther in an embedding space, which is expressed as follows:

$$\text{sgn}(\nabla_\theta \mathcal{L}_{RankMI}) = \text{sgn}(\nabla_\theta d_{ij}^+), \quad (22a)$$

$$\text{sgn}(\nabla_\theta \mathcal{L}_{RankMI}) = -\text{sgn}(\nabla_\theta d_{ij}^-), \quad (22b)$$

$$\forall (i,j) \in \{i,j | p(d_{ij}^+|\theta_t) \neq 0 \text{ or } p(d_{ij}^-|\theta_t) \neq 0\}.$$

This property is satisfied if the following holds for $V_\phi$:

$$\frac{\partial V_\phi}{\partial d_{ij}} < 0. \quad (23)$$

That is, if $V_\phi$ is decreasing around a neighborhood of distances for positive and negative pairs at a given timestamp during training, the loss minimizes the positive pair distances and maximizes the negative pair distances. When Equation (23) holds, mutual information and distance are not only created but also have a monotonic relationship (higher mutual information corresponds to lower distance).

In practice, this requirement on $V_\Theta$ may not be violated during stochastic gradient descent (SGD) because with initialization of $f_\theta$ with pre-trained weights, distributions are already separated in a desired direction at t=0. It is empirically observed that $V_\Theta$ naturally converges to a decreasing function early in training. However, to better facilitate this property, a residual connection from an input of $V_\Theta$ is added to its output, such that it is of the form:

$$V_\Theta(x) := \tilde{V}_\Theta(x) - x, \quad (24)$$

thus maximizing $\partial V_\Theta / \partial V_{ij} \approx 1$ at t=0 (with standard weight initialization of $V_\Theta$).

One can provide soft constraints on $V_\Theta$ to ensure Equation (23) holds.

It has been shown that sampling is important for deep representation learning, regardless of a loss function being used. Margins are used as an additional strategy for improving sampling, because margins are used to drop easy positives and negatives from a batch and to focus on harder, margin-violating samples. Therefore, one embodiment provides Algorithm 1 to incorporate margin enforcement and negative sampling schemes, as reproduced below:

---
Require: $\theta_0$, $\phi_0$: Initial network parameters
Require: $lr_\theta$, $lr_\phi$: Learning rates
Require: $\beta_0$: Initial value of $\beta$
Require: $\alpha$: Fixed
Require: k: Alternating gradient descent ratio
Require: B: Mini-batch size
 1:  t ← 0
 2:  $\beta_t$ ← estimateBeta($\phi_0$, $\beta_0$)
 3:  while stoppingCriterionNotMet do
 4:    for $x_{1:B}$, $c_{1:B}$ in dataset do
 5:      $z_{1:B}$ ← $f_\theta(x_{1:B})$
 6:      $d_{ij}$ ← $|z_i - z_j|_2$ $\forall (i, j) \in \{1, 2, \ldots, B\}$
 7:      $d_{ij}^+$ ← $d_{ij}[c_i == c_j]$
 8:      $d_{ij}^-$ ← $d_{ij}[c_i \neq c_j]$
 9:      if t mod (k + 1) ≠ 0 then
10:        Comment: Update statistics network, $V_\phi$
11:        loss ← $L_{RankMI}(d_{ij}^+, d_{ij}^-, \phi_t)$
12:        $\nabla \phi_t$ ← $\nabla_\phi$loss
13:        $\phi_{t+1}$ ← $\phi_t - lr_\phi * \nabla \phi_t$
14:        $\beta_{t+1}$ ← estimateBeta($\phi_{t+1}$, $\beta_t$)
15:        Comment: Do not update embedding network, $f_\theta$
16:        $\theta_{t+1}$ ← $\theta_t$
17:      else
18:        Comment: Update embedding network, $f_\theta$
19:        $d_{ij}^+$ ← $d_{ij}^+[d_{ij}^+ > \beta_t - \alpha]$
20:        $d_{ij}^-$ ← $d_{ij}^-[d_{ij}^- < \beta_t + \alpha]$
21:        $d_{ij}^-$ ← negSampling($d_{ij}^-$)
22:        loss ← $L_{RankMI}(d_{ij}^+, d_{ij}^-, \phi_t)$
23:        $\nabla \theta_t$ ← $\nabla_\theta$loss
24:        $\theta_{t+1}$ ← $\theta_t - lr_\theta * \nabla \theta_t$
25:        Comment: Do not update statistics network, $V_\phi$
26:        $\phi_{t+1}$ ← $\phi_t$
27:        $\beta_{t+1}$ ← $\beta_t$
28:      t ← t + 1
29:  return $\theta_t$
---

Figure 4:
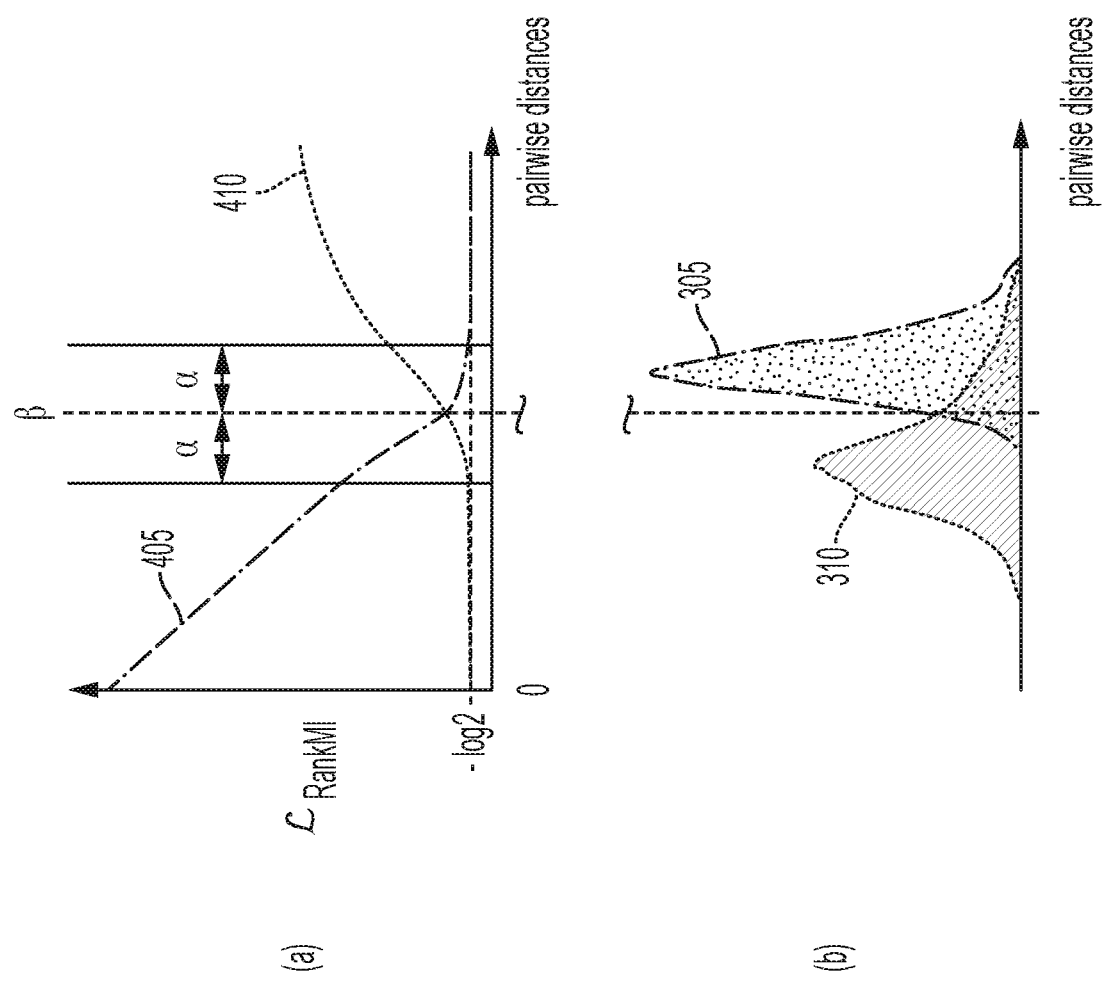
FIG. 4 is a diagram of a loss that is learned as a function of pairwise distances, according to embodiments.

FIG. 4 is a diagram of a loss that is learned as a function of pairwise distances, according to embodiments.

In portion (a), a dotted line 410 represents a loss that is incurred by a positive pair that is calculated as $T_\phi(z_i, z_j)$, a first component of the loss in Equation (20). A dashed line 405 represents a loss that is incurred by a negative pair that is calculated as $\log(2 - e^{T_\phi(z_i, z_j)})$, a second component of the loss in Equation (20). $\beta$ is a distance score for which the dashed line 405 and the dotted line 410 intersect, where positive and negative pairs incur equal loss.

In portion (b), the positive pair distance distribution 305 and the negative pair distance distribution 310 are shown. $\beta$ marks a point where $p(d_{ij}^+|\theta_t) = p(d_{ij}^-|\theta_t)$.

It is observed that analytically, $T_\phi(z_i, z_j) = 0$ is a solution that makes the two terms of $\mathcal{L}_{RankMI}$ equal for a same $d_{ij}$ value. Further, solving for $V_\phi$ in Equation (21), $V_\phi(\beta) = 0$. Then, a root-finding algorithm, such as Newton's method, can be used to closely approximate $\beta_t$ given current parameters $\phi_t$ at training step t. This step is repeated every time parameters $\phi$ are updated as shown in line 14 of Algorithm 1, and adds negligible computational overhead.

Once $\beta$ is found, margins a can be incorporated into the training algorithm. FIG. 4 highlights the effect of these margins on the ranking loss. In particular, negative pairs can be dropped if $d_{ij}^- > \beta + \alpha$, and positive pairs can be dropped if $d_{ij}^+ < \beta - \alpha$. As outlined in the Algorithm 1, the training procedure alternates between two phases: updates to the statistics network, and updates to the embedding network. For k steps, all positive and negative pairs available in a batch are used to tighten a divergence lower bound that is estimated via the parameters $\phi$ and Equation (16). All available samples are used for this phase because using more samples improves approximation to expectations in Equation (16). Then, a single update on the embedding network is performed after filtering out samples that are not margin-violating and employing any negative sampling procedure, such as distance weighted (see Algorithm 1, lines 19-21). This procedure allows a strength of mutual information neural estimators to be leveraged, without sacrificing the ability to employ negative sampling strategies.

Even though the requirement $$\frac{\partial V_\phi}{\partial d_{ij}} < 0,$$

as described in Equation (23), is not violated, a non-monotonic $V_\Theta$ may maximize the divergence between two 1D distributions by incorporating an order loss $\mathcal{L}_{order}$ into a total loss $\mathcal{L}_{der}$. In an embodiment of the disclosure, the order loss $\mathcal{L}_{order}$ may be calculated according to Equation (25), and may be added to the ranking loss $\mathcal{L}_{RankMI}$ to obtain the total loss $\mathcal{L}_{order}$ as shown in Equation (26) below:

$$\mathcal{L}_{order} = \frac{1}{\|\mathcal{P}\|} \Sigma_{(z_i, z_j) \in \mathcal{P}} \max\left(0, \frac{\partial V_\phi}{\partial d_{ij}}\right) + \frac{1}{\|\mathcal{N}\|} \Sigma_{(z_i, z_j) \in \mathcal{N}} \max\left(0, \frac{\partial V_\phi}{\partial d_{ij}}\right). \quad (25)$$

$$\mathcal{L}_{total} = \mathcal{L}_{RankMI} + \lambda \mathcal{L}_{order}. \quad (26)$$

Here, $\lambda$ denotes a scalar weighting factor.

Based on the calculation of the total loss $\mathcal{L}_{total}$ by adding the order loss $\mathcal{L}_{order}$ to the ranking loss $\mathcal{L}_{RankMI}$, the parameter space CD may be softly constrained to corresponding functions $V_\Theta$ that are non-increasing.

Figure 5:
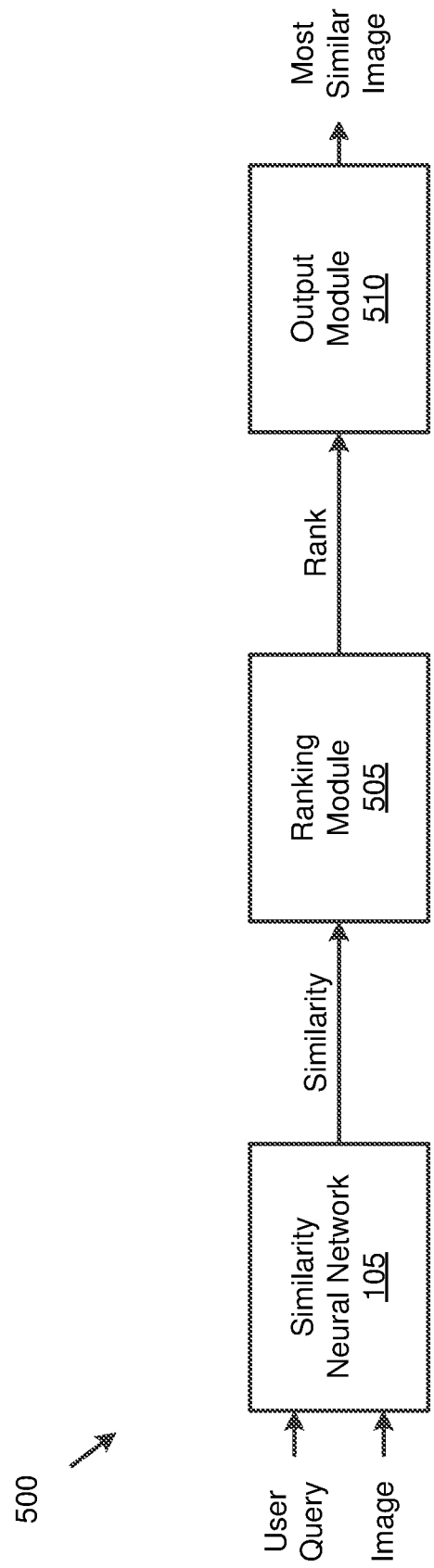
FIG. 5 is a block diagram of an apparatus for providing similar contents, using a neural network, according to embodiments.

FIG. 5 is a block diagram of an apparatus 500 for providing similar contents, using a neural network, according to embodiments.

As shown in FIG. 5, the apparatus 500 includes the similarity neural network 105, a ranking module 505 and an output module 510.

The similarity neural network 105 obtains a user query and an image, and obtains a similarity value between the obtained user query and image, as described in FIG. 1 above. The similarity neural network 105 is trained based on the method 200 described in FIG. 2 above. The user query may be a textual or spoken utterance of a user. In embodiments, the user query may be an image or video content that is selected by the user.

The ranking module 505 obtains, from the similarity neural network 105, a plurality of similarity values between the user query and a plurality of images including the obtained image, the plurality of similarity values being obtained by the similarity neural network 105. The ranking module 505 further obtains a rank of each of the obtained plurality of similarity values. The rank of a respective one of the plurality of similarity values may be higher, based on the respective one of the plurality of similarity values being higher.

The output module 510 obtains, from the ranking module 505, the rank of each of the plurality of similarity values, and outputs, as a most similar image to the user query, at least one among the plurality of images that has a respective one among the plurality of similarity values that corresponds to a highest rank among the obtained rank of each of the plurality of similarity values. The most similar image may be output to a display for display.

By using the similarity neural network 105 trained based on the method 200, the apparatus 500 may find and output the most similar image to the user query more accurately than prior art systems.

Figure 6:
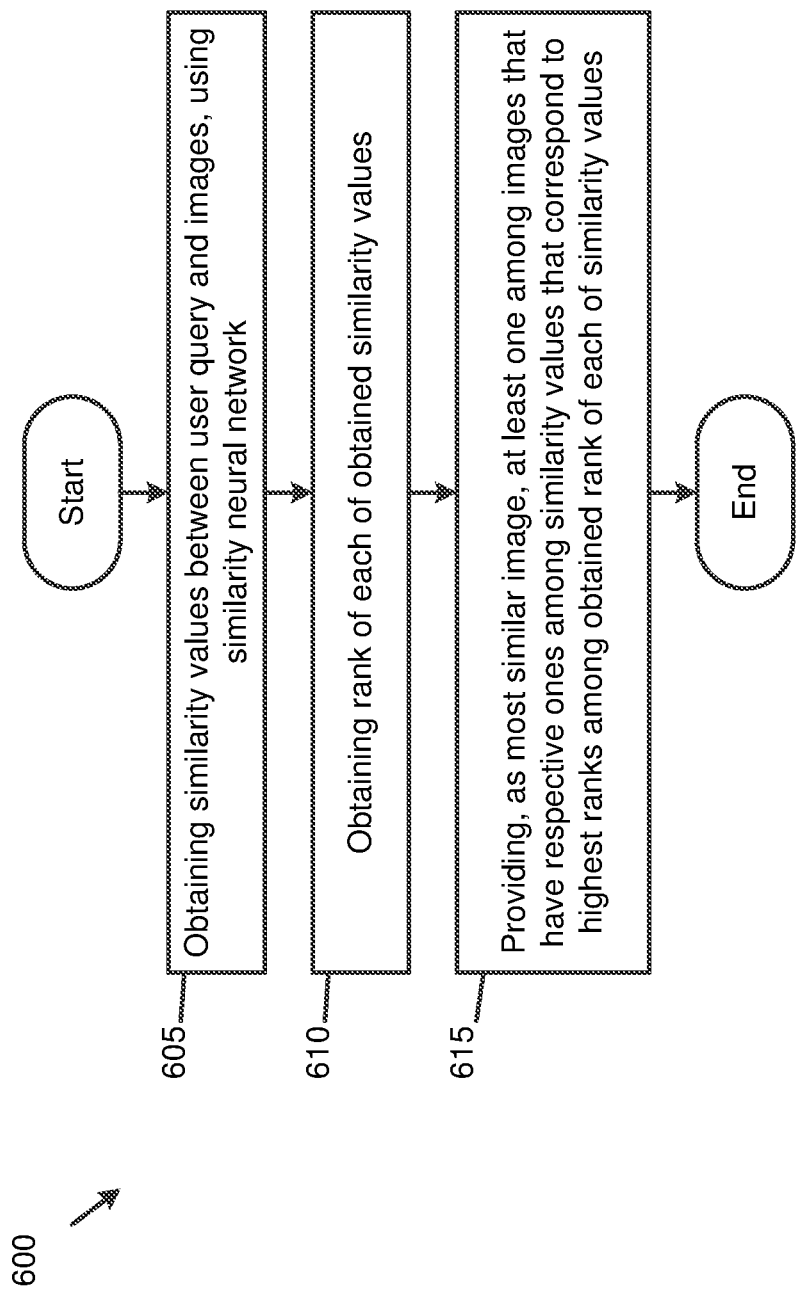
FIG. 6 is a flowchart of a method of providing similar contents, using a neural network, according to embodiments.

FIG. 6 is a flowchart of a method 600 of providing similar contents, using a neural network, according to embodiments.

Referring to FIG. 6, the method 600 may be performed by the apparatus 500 of FIG. 5.

In operation 605, the method 600 includes obtaining a plurality of similarity values between a user query and a plurality of images, using the similarity neural network 105.

In operation 610, the method 600 includes obtaining a rank of each of the obtained plurality of similarity values.

In operation 615, the method 600 includes providing, as a most similar image to the user query, at least one among the plurality of images that has a respective one among the plurality of similarity values that corresponds to a highest rank among the obtained rank of each of the plurality of similarity values.

Figure 7B:
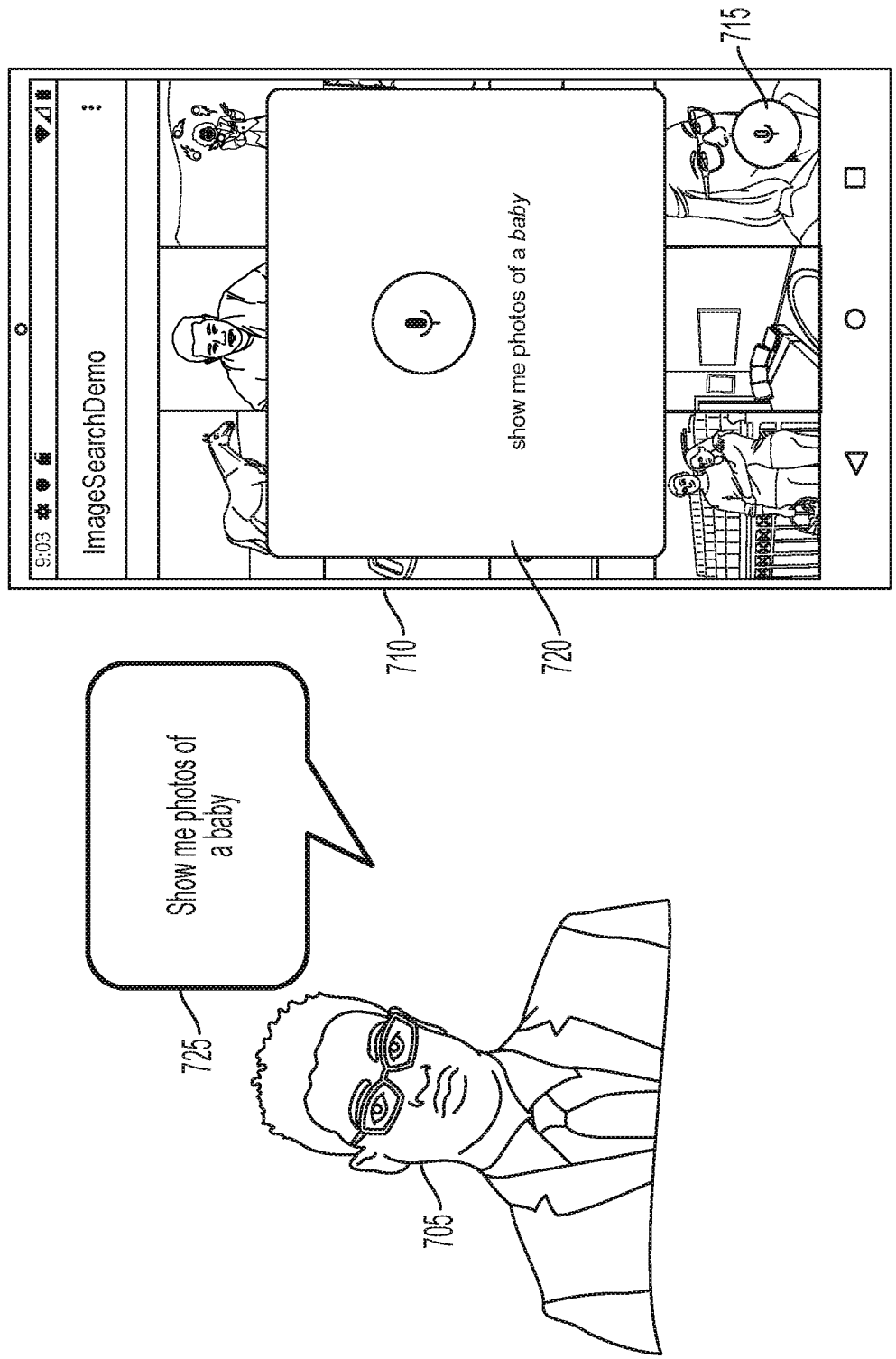

FIGS. 7A, 7B, 7C are diagrams illustrating a use case of the apparatus 500 shown in FIG. 5.

As shown in FIG. 7A, a user 705 may be viewing and/or using a screen 710 of a gallery application. The screen 710 includes a plurality of thumbnails, each of which may be selected for displaying a respective one among a plurality of images.

As shown in FIG. 7B, the user 705 may select a microphone icon 715 that is displayed on the screen 710. Based on the microphone icon 715 being selected, a user interface 720 may be displayed on the screen 710, and indicate that the gallery application or an operating system is listening for a user query or a spoken utterance of the user 705. Based on the user interface 720 being displayed, the user may utter a search query 725 that may be considered as the user query, "Show me photos of a baby." Based on the search query 725 being uttered, a text of the search query 725 may be displayed on the user interface 720.

In response to the search query 725 being uttered, a smartphone implementing the apparatus 500 and including the gallery application may compare the search query 725 to a plurality of images, using the similarity neural network 105 trained based on the method 200 of FIG. 2. The smartphone may find a most similar image 730 to the search query 725.

As shown in FIG. 7C, the smartphone may display the found most similar image 730 on the screen 710 to the user 705. In addition, the smartphone may display, on the screen 710, a text 735 of the search query 725, along with a plurality of thumbnails 740, each of which may be selected for displaying a respective one among a plurality of images that is also similar to the user query. In FIG. 7C, each of the most similar image 730 and the plurality of thumbnails 740 includes a baby, based on the search query 725, "Show me photos of a baby."

Figure 8:
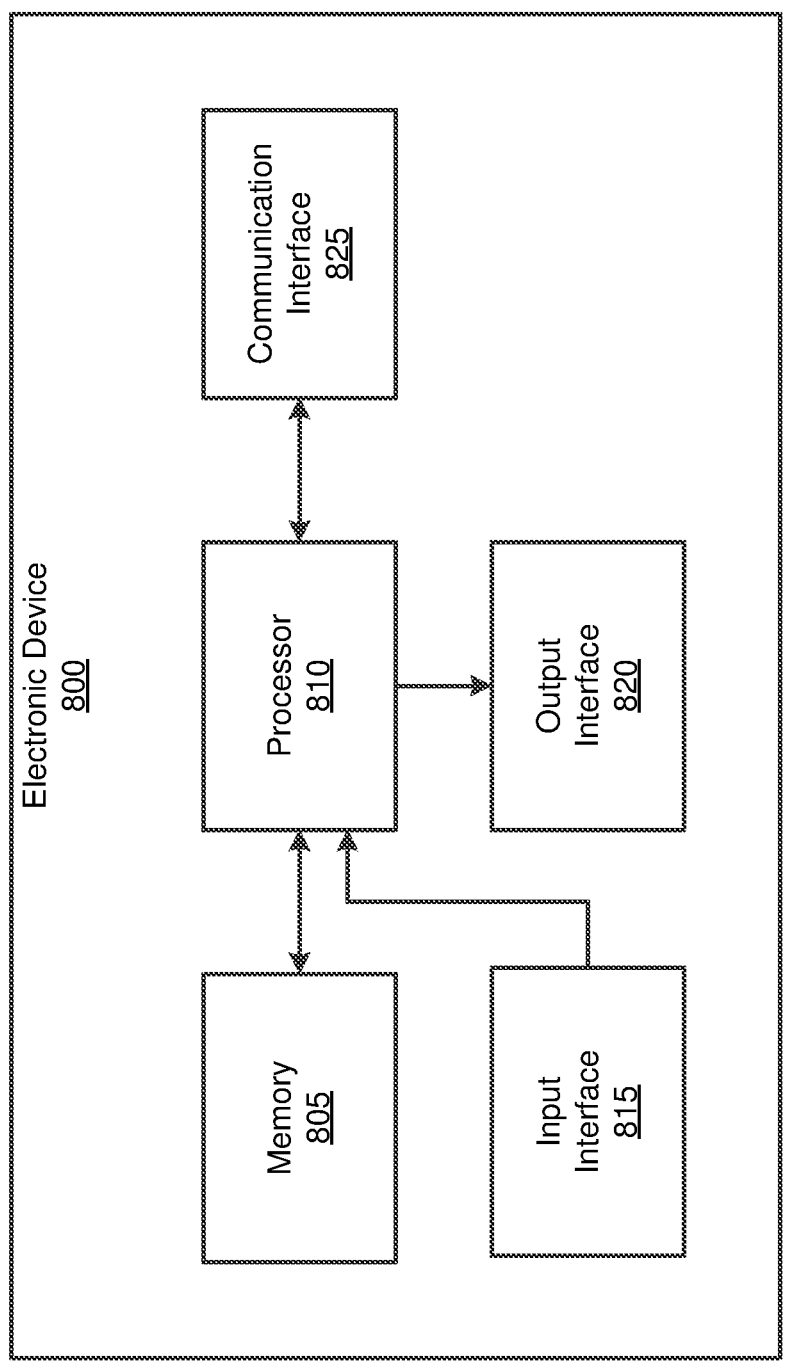
FIG. 8 is a block diagram of an electronic device, according to embodiments.

FIG. 8 is a block diagram of an electronic device 800, according to embodiments.

Referring to FIG. 8, the electronic device 800 includes a memory 805, a processor 810, an input interface 815 and an output interface 820. The electronic device 800 may be implemented in each of the apparatus 100 of FIG. 1 and the apparatus 500 of FIG. 5.

The processor 810 takes overall control of the electronic device 800. The processor 810 executes one or more programs stored in the memory 805.

The memory 805 stores various data, programs, or applications for driving and controlling the electronic device 800. A program stored in the memory 805 includes one or more instructions. A program (one or more instructions) or an application stored in the memory 805 may be executed by the processor 810.

The processor 810 may perform any one or any combination of operations of the apparatus 100 and the apparatus 500 that are respectively shown in FIGS. 1 and 5 and have been described with reference to FIGS. 1-7C.

The input interface 815 may receive a user input and/or a data such as a state of an agent. The input interface 815 may include, for example, a touchscreen, a camera, a microphone, a keyboard, a mouse or any combination thereof.

The output interface 820 may obtain data from, e.g., the processor 810, and may output the obtained data. The output interface 820 may include, for example, a touchscreen, a television, a computer monitor, a speaker or any combination thereof.

The block diagram of the electronic device 800 is provided as an example. Each component in the block diagram may be integrated, added, or omitted depending upon specifications of the electronic device 800 that is actually implemented. That is, two or more components may be integrated into one component or one component may be divided into two or more components, as needed. In addition, functions performed by the respective blocks are provided for illustrating the embodiments of the disclosure, and operations or devices of the respective blocks do not limit the scope of the disclosure.

The new loss function for retrieval tasks according to embodiments outperforms results in multimodal retrieval. To do this, neural networks are used as function approximators to simultaneously estimate and maximize a divergence between similarity score distributions of matching and non-matching pairs to learn a ranking. A set of functions used are softly constrained for this estimation to be locally increasing via a gradient penalty term, so that the loss always increases the similarity of positive pairs and decreases the similarity of negative pairs. This soft constraint ensures that trivial solutions that maximize the divergence between matching and non-matching distributions but with a wrong order are avoided. The loss function does not require any scaling on the similarity scores as its domain is not bounded.

The embodiments of the disclosure described above may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

A model related to any of the neural networks described above may be implemented via a software module. When a neural network model is implemented via a software module (for example, a program module including instructions), the neural network model may be stored in a computer-readable recording medium.

Also, the neural network model may be a part of the apparatus 100 described above by being integrated in a form of a hardware chip. For example, the neural network model may be manufactured in a form of a dedicated hardware chip for AI, or may be manufactured as a part of an existing general-purpose processor (for example, CPU or application processor) or a graphic-dedicated processor (for example GPU).

Also, the neural network model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

While the embodiments of the disclosure have been described with reference to the figures, it will be understood by those of ordinary skill in the art that various changes in form and details may be made therein without departing from the spirit and scope as defined by the following claims.

What is claimed is:

1. An apparatus for providing similar contents, using a neural network, the apparatus comprising:
    a memory storing instructions; and
    a processor configured to execute the instructions to:
        obtain a plurality of similarity values between a user query and a plurality of images, using a similarity neural network;
        obtain a rank of each the obtained plurality of similarity values; and
        provide, as a most similar image to the user query, at least one among the plurality of images that has a respective one among the plurality of similarity values that corresponds to a highest rank among the obtained rank of each of the plurality of similarity values,
    wherein the similarity neural network is trained with a divergence neural network for outputting a divergence between a first distribution of first similarity values for positive pairs, among the plurality of similarity values, and a second distribution of second similarity values for negative pairs, among the plurality of similarity values,
    wherein the similarity neural network is trained by obtaining a loss based on a loss function in which the divergence is input, and by updating parameters of the similarity neural network and the divergence neural network, based on the obtained loss, and
    wherein the loss function comprises a first component which is arranged to capture an overlap loss between a first distribution and a second distribution and a second component which is arranged to enforce a specific order between the first distribution and the second distribution.

2. The apparatus of claim 1, wherein the similarity neural network is trained to maximize the divergence output by the divergence neural network.

3. The apparatus of claim 1, wherein the positive pairs are matching pairs among samples that are used to train the similarity neural network, and
    the negative pairs are non-matching pairs among the samples.

4. The apparatus of claim 1, wherein the loss function comprises a first negative term of a lower bound on the divergence.

5. The apparatus of claim 4, wherein the loss function further comprises a second negative term that is obtained to maintain positive a derivative of a function that is represented by the divergence neural network.

6. The apparatus of claim 1, wherein the user query comprises a textual or spoken utterance of a user.

7. A method of providing similar contents, using a neural network, the method comprising:
    obtaining a plurality of similarity values between a user query and a plurality of images, using a similarity neural network;
    obtaining a rank of each the obtained plurality of similarity values; and
    providing, as a most similar image to the user query, at least one among the plurality of images that has a respective one among the plurality of similarity values that corresponds to a highest rank among the obtained rank of each of the plurality of similarity values,
    wherein the similarity neural network is trained with a divergence neural network for outputting a divergence between a first distribution of first similarity values for positive pairs, among the plurality of similarity values, and a second distribution of second similarity values for negative pairs, among the plurality of similarity values,
    wherein the similarity neural network is trained by obtaining a loss based on a loss function in which the divergence is input, and by updating parameters of the similarity neural network and the divergence neural network, based on the obtained loss, and
    wherein the loss function comprises a first component which is arranged to capture an overlap loss between a first distribution and a second distribution and a second component which is arranged to enforce a specific order between the first distribution and the second distribution.

8. The method of claim 7, wherein the similarity neural network is trained to maximize the divergence output by the divergence neural network.

9. The method of claim 7, wherein the positive pairs are matching pairs among samples that are used to train the similarity neural network, and the negative pairs are non-matching pairs among the samples.

10. The method of claim 7, wherein the loss function comprises a first negative term of a lower bound on the divergence.

11. The method of claim 10, wherein the loss function further comprises a second negative term that is obtained to maintain positive a derivative of a function that is represented by the divergence neural network.

12. The method of claim 7, wherein the user query comprises a textual or spoken utterance of a user.

13. A non-transitory computer-readable storage medium storing instructions to cause a processor to:
obtain a plurality of similarity values between a user query and a plurality of images, using a similarity neural network;
obtain a rank of each the obtained plurality of similarity values; and
provide, as a most similar image to the user query, at least one among the plurality of images that has a respective one among the plurality of similarity values that corresponds to a highest rank among the obtained rank of each of the plurality of similarity values,
wherein the similarity neural network is trained with a divergence neural network for outputting a divergence between a first distribution of first similarity values for positive pairs, among the plurality of similarity values, and a second distribution of second similarity values for negative pairs, among the plurality of similarity values,
wherein the similarity neural network is trained by obtaining a loss based on a loss function in which the divergence is input, and by updating parameters of the similarity neural network and the divergence neural network, based on the obtained loss, and
wherein the loss function comprises a first component which is arranged to capture an overlap loss between a first distribution and a second distribution and a second component which is arranged to enforce a specific order between the first distribution and the second distribution.

14. The non-transitory computer-readable storage medium of claim 13, wherein the similarity neural network is trained to maximize the divergence output by the divergence neural network.

15. The non-transitory computer-readable storage medium of claim 13, wherein the positive pairs are matching pairs among samples that are used to train the similarity neural network, and
the negative pairs are non-matching pairs among the samples.

16. The non-transitory computer-readable storage medium of claim 13, wherein the loss function comprises a first negative term of a lower bound on the divergence.

17. The non-transitory computer-readable storage medium of claim 16, wherein the loss function further comprises a second negative term that is obtained to maintain positive a derivative of a function that is represented by the divergence neural network.

* * * * *